United States Patent [19]

Itoo et al.

[11] 4,046,856

[45] Sept. 6, 1977

[54] METHOD FOR REMOVING SULFUR OXIDE FROM STACK GAS

[75] Inventors: Hayami Itoo; Noriaki Takahashi, both of Kobe; Hiromasa Kouda, Akasi, all of Japan

[73] Assignee: Kawasaki Jukogyo Kabushiki Kaisha, Kobe, Japan

[21] Appl. No.: 451,394

[22] Filed: Mar. 15, 1974

[51] Int. Cl.$^2$ .............. C01F 1/00; C01F 5/40; C01F 11/46; C01B 17/00
[52] U.S. Cl. ...................... 423/166; 423/242
[58] Field of Search .............. 423/242–244, 423/164, 166, 555

[56] References Cited

U.S. PATENT DOCUMENTS

| 658,327 | 9/1900 | Vis | 423/166 |
|---|---|---|---|
| 2,573,616 | 10/1951 | Seailles | 423/164 |
| 3,520,649 | 7/1970 | Tomany et al. | 423/242 |
| 3,556,722 | 1/1971 | Owaki | 423/242 |
| 3,632,306 | 1/1972 | Villiers-Fisher et al. | 423/242 |
| 3,687,613 | 8/1972 | Richard | 423/242 |
| 3,883,639 | 5/1975 | Cronkright et al. | 423/166 |
| 3,919,394 | 11/1975 | Selmeczi | 423/242 |

*Primary Examiner*—O. R. Vertiz
*Assistant Examiner*—Gregory A. Heller
*Attorney, Agent, or Firm*—Sughrue, Rothwell, Mion, Zinn and Macpeak

[57] ABSTRACT

In a method for removing sulfur oxides in a stack gas by absorbing the sulfur oxides in an absorbent comprising predominantly calcium compounds, thereby converting the sulfur oxides to sulfites, and then oxidizing the sulfites to gypsum, the improvement where the absorbent further contains a magnesium compound such as $Mg(OH)_2$, $MgCO_3$ or $MgSO_4$.

4 Claims, 3 Drawing Figures

METHOD FOR REMOVING SULFUR OXIDE FROM STACK GAS

BACKGROUND OF THE INVENTION

1. Field of the Invention

The present invention relates to a method for removing sulfur oxides from a stack gas.

2. Description of the Prior Art

Absorption processes for removing sulfur oxide from a stack gas are known where a slurry comprising a calcium compound is used, e.g., $CaO$, $CaCO_3$, $Ca(OH)_2$, etc., as the absorbent. Such process generally comprise two stages:

a. an absorption stage, where the sulfur oxide is absorbed from the stack gas and converted to the sulfite form; and b. an oxidation stage where the absorbed sulfur oxide in the sulfite form is oxidized to gypsum.

In the absorbing stage, $CaSO_3$ is produced by reaction according to formulae (1) or (2), $$Ca(OH)_2 + SO_2 \rightarrow CaSO_3 + H_2O \quad (1)$$
$$CaCO_3 + SO_2 \rightarrow CaSO_3 + CO_2 \quad (2)$$

The solubility of $CaCO_3$ in water is so small that a "blinding" phenomenon, i.e., a covering of particles of $CA(OH)_2$ or $CaCO_3$ which have not yet reacted, occurs.

This blinding phenomenon is the greatest demerit in desulfurizing a stack gas using a calcium compound, causing a drop in the $SO_2$ absorbing efficiency or in the utilization efficiency of Ca.

To alleviate the above fault, slurry wet shredders or delay tanks in the circulatory system of the absorbing slurry of the calcium compound have been used. However, even such devices do not enable a utilization efficiency of the calcium compound of 100% to be obtained, and a 20 to 100% surplus of $Ca(OH)_2$ or $CaCO_3$ must be supplied.

Thus, following the prior art substantial absorption efficiency problems are invariably encountered in the absorption step. Further, prior art processes also suffer from defects in the oxidation step.

The object of the oxidation step is to recover good quality gypsum from the $CaSO_3$ resulting from the sulfur oxide absorption. For the formation of good quality gypsum, the pH of the absorbent slurry must be kept under 5 during oxidation.

Usually, sulfuric acid is added to regulate the pH of the absorbent slurry, but most of the sulfuric acid is consumed in neutralizing the $Ca(OH)_2$ or $CaCO_3$ present, and in this case the before-mentioned blinding phenomenon again occurs.

Furthermore, dropping the pH of the circulating absorbent slurry to decrease scaling and to increase the utilization of $Ca(OH)_2$ and $CaCO_3$ to keep the desulfurizing rate high requires severe conditions.

SUMMARY OF THE INVENTION

Taking the various disadvantages of the prior art calcium compound sulfur oxide absorption processes into consideration, the inventors have developed a desulfurizing process for a stack gas wherein a magnesium compound such as $Mg(OH)_2$, $MgCO_3$ and $MgSO_4$ is used in combination with a calcium compound as heretofore described.

According to the inventor's research, while a magnesium compound such as $MgSO_3$ has a low solubility, it is nonetheless two or three times higher in solubility than $CaSO_3$. Accordingly, the blinding phenomenon does not occur and the absorbing operation is completed with $Mg(OH)_2$ equivalent to the $SO_2$ in the stack gas, and in the case of an $MgSO_3$ oxidizing, the speed of sulfite solution, which is generally slow, is considerably increased.

The present invention thus incorporates the merits of a magnesium compound into a desulfurizing process which uses a calcium compound as the absorbent, permitting small scale equipment to be used and yielding good quality gypsum ($CaSO_4.2H_2O$).

DETAILED DESCRIPTION OF THE INVENTION

In accordance with the present invention, a magnesium compound or compounds is added to an absorbent consisting mainly of a calcium compound or compounds, the absorbent being used to absorb sulfur oxides and remove the same from a stack gas in the form of sulfite. The sulfite produced is oxidized into gypsum. The gypsum is separated and a double decomposition performed which regenerates $Mg(OH)_2$ for reuse.

The present invention thus relates to a method for removing sulfur oxides in a stack gas with improved absorption efficiency and an increased rate of sulfite oxidation, which permits the amount of sulfuric acid needed for neutralizing the sulfite-containing absorption product to be reduced, prevents equipment scaling and provides good quality gypsum, by adding a magnesium compound or compounds such as $Mg(OH)_2$, $MgSO_4$, $MgSO_3$, $MgCO_3$, etc., or a mixture thereof, to a circulating slurry of an absorbent which comprises primarily one or more calcium compounds.

Figure 1:
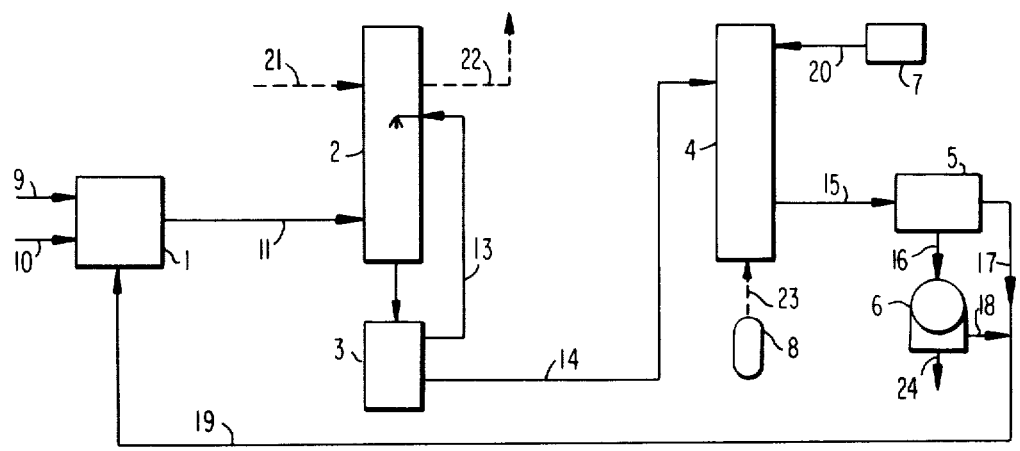
FIGS. 1 and 2 are schematic flow diagrams illustrating embodiments of the present invention.

With reference to FIG. 1, $Ca(OH)_2$ 9, $H_2O$ 10 and supernatant liquid from thickener 5 (supplied by line 17, 19) are fed to a double decomposition reactor 1. The main component of the supernatant liquid from thickener 5 is an $MgSO_4$ solution, the balance being $CaSO_4$ in proportion to solubility.

In the double decomposition reactor 1, the following reaction (3) proceeds and $Mg(OH)_2$ is produced:

$$MgSO_4 + Ca(OH)_2 \rightarrow Mg(OH)_2 + CaSO_4(slurry) \quad (3)$$

The resulting slurry is fed via line 11 to absorber 2.

The amount of $MgSO_4$ supplied via line 19 to double decomposition reactor 1 is important in deciding the density of the slurry and the proportion of $Ca(OH)_2$ and $Mg(OH)_2$ in the slurry supplied in line 11 to absorber 2. Reaction (3) proceeds to the right substantially 100% if reaction time is long, so when $MgSO_4$ equivalent to $Ca(OH)_2$ is supplied to reactor 1, almost all of the solids content of the slurry in the double decomposition reactor 1 will be $CaSO_4$ and $Mg(OH)_2$.

The double decomposition is carried out at a temperature of ordinary temperature to 60° C and atmospheric pressure in the reactor 1.

Since $Mg(OH)_2$ has a greater capacity for absorbing $SO_2$ than $Ca(OH)_2$, an equimolar reaction of $Ca(OH)_2$ and $Mg(OH)_2$ is the ideal condition if only the absorbing process is considered. On the other hand, $CaSO_4$, which is produced by reaction (3), is in the form of a paste, and as such is not compatible with the object of this invention which is to obtain good quality gypsum.

Figure 3:
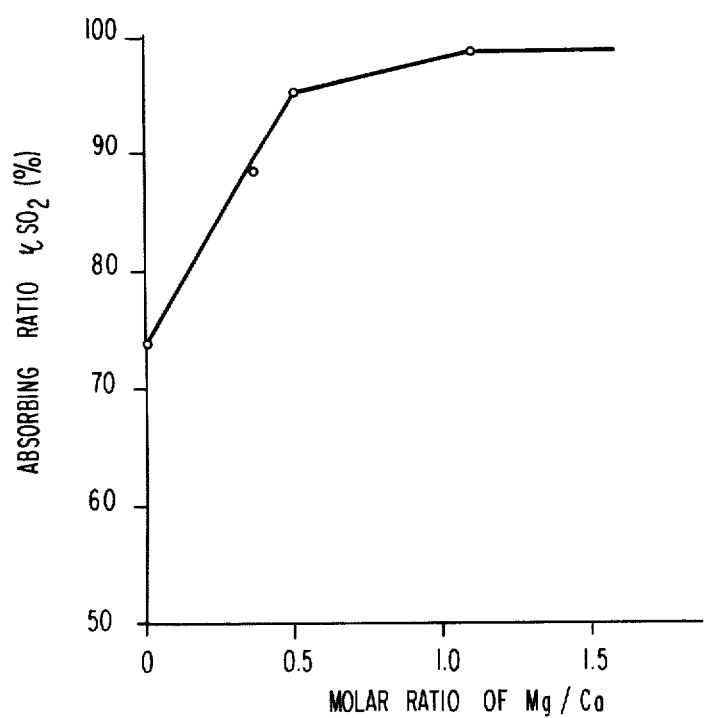
FIG. 3 is a plot of the molar ratio of Mg/Ca versus the absorption efficiency of $SO_2$.

Considering the objectives of both the absorbing and oxidizing steps, a suitable molar ratio of $Mg^{2+}/Ca^{2+}$ which enables one to take advantage of the characteristics of the Mg compound in the step of the absorption without harm to the quality of the gypsum product is where the absorbing efficiency for $SO_2$ is increased in proportion to added amounts of $Mg^{2+}$ as is shown in FIG. 3. In practice, the amount of addition of $Mg^{2+}$ is fixed as occasion demands.

In FIG. 3, the vertical axis represents the absorbing efficiency of $SO_2$ and the horizontal axis represents the molar ratio of Mg/Ca. A remarkable increase in the absorbing efficiency of $SO_2$ over the 0 to 0.5 molar ratio of Mg/Ca range is easily seen in FIG. 3.

The slurry supplied from double decomposition reactor 1 to absorber 2 is composed mainly of $Mg(OH)_2$, $Ca(OH)_2$, and $CaSO_4$. A molar ratio between $Ca(OH)_2$ and $Mg(OH)_2$ of $(Ca^{2+}/Mg^{2+})$ mol. = 0.5 to 99.0 is suitable.

In absorber 2, $SO_2$ is absorbed by the slurry fed via line 11 according to reactions (4), (5) from waste gas which is supplied to the absorber 2 via line 21:

$$Mg(OH)_2 + SO_2 \rightarrow MgSO_3 + H_2O \quad (4)$$
$$Ca(OH)_2 + SO_2 \rightarrow CaSO_3 + H_2O \quad (5)$$

As earlier indicated, when $Mg(OH)_2$ is present in the $Ca(OH)_2$ slurry, the efficiency of absorbing $SO_2$ is improved.

When the molar ratio of $Ca(OH)_2$ and $Mg(OH)_2$ is $(Ca^{2+}/Mg^{2+})$mol = 1:5, the absorbing efficiency is improved 20% as compared with a slurry which is mainly composed of $Ca(OH)_2$.

The absorber 2 is operated at a temperature of 40°–70° C and −1000 - +1000mm $H_2O$(guage).

To recover good quality gypsum, it is desirable that dust be removed from the waste gas containing sulfur oxide fed to absorber 2 via line 21 to clean the gas.

Waste gas which has been desulfurized is discharged from absorber 2 via discharge line 22. Some of the absorbing slurry is recirculated and sprayed into absorber 2 via line 13 after passing into hold tank 3 for the circulating absorbing slurry, but a part of the slurry is fed to oxidizer 4, which is operated at a temperature from ordinary temperature to 70° C and a pressure from atmospheric to 5kg/cm²(gauge), via line 14.

The solid components of the slurry supplied to oxidizer 4 are mainly $CaSO_4$, $MgSO_3$ and $CaSO_3$, the balance being $Ca(OH)_2$ which has not been reacted. In the liquid are present $MgSO_4$, which has been produced in the absorber 2, and $CaSO_4$, $MgSO_3$ and $CaSO_3$ which keep balanced at saturated solubility. $Mg(HSO_3)_2$ and $Ca(HSO_3)_2$ are also present when the liquid is acidic.

When a magnesium compound is added to the absorbent containing calcium compound in accordance with this invention, $Ca(OH)_2$ which does not react is only present at low percentages by actual value. In contrast, when only $Ca(OH)_2$ is used unreacted $Ca(OH)_2$ can be present in amounts of up to 20 - 100%.

To produce good quality gypsum in oxidizer 4, the pH of the slurry must be under 5. Sulfuric acid as a pH controller is added from sulfuric acid tank 7 through line 20. When the slurry from absorber 2 contains unreacted $Ca(OH)_2$, $Ca(OH)_2$ reacts with sulfuric acid in accordance with formula (6) and $CaSO_4$ is produced.

When sulfuric acid is consumed in this manner, the sulfuric acid cannot serve to drop the pH of the slurry.

$$H_2SO_4 + Ca(OH)_2 \rightarrow CaSO_4 + 2H_2O \quad (6)$$

The pH of the slurry is decreased only when the reactions of formulae (7) –(8) proceed.

$$2CaSO_3 + H_2SO_4 \rightarrow Ca(HSO_3)_2 + CaSO_4 \quad (7)$$

$$2MgSO_3 + H_2SO_4 \rightarrow Mg(HSO_3)_2 + MgSO_4 \quad (8)$$

Accordingly, to reduce the amount of sulfuric acid required, unreacted $Ca(OH)_2$ must be kept down, and in accordance with the present invention, the amount of unreacted $CaSO_3$ is very small due to the effect of the magnesium compound. An additional effect of magnesium compound is that the oxidation speed of $MgSO_3$ is faster than $CaSO_3$.

It has been demonstrated by tests that in the case of oxidizing a mixed slurry of $CaSO_4$ and $MgSO_3$, the greater the amount of $MgSO_3$, the faster the rate of formation of $CaSO_4$ becomes. Therefore, the capacity of the oxidizer can be reduced in accordance with the present invention.

Air is supplied to the oxidizer 4 from compressor 8 via line 23, and $CaSO_4$ is oxidized and converted to gypsum according to formulae (9) and (10).

$$HSO_3^- + 1/2O_2 \rightarrow SO_4^{2-} + H^+ \quad (9)$$

$$SO_3^{2-} + H^+ \rightarrow HSO_3^-$$

$$SO_3^{2-} + 1/2O_2 \rightarrow SO_4^{2-} \quad (10)$$

Following oxidation, the resulting slurry is discharged from oxidizer 4 into thickener 5 via line 15. In thickener 15 the gypsum $CaSO_4 \cdot 2H_2O$ is sedimented and separated. The gypsum is then passed via line 16 to centrifuge 6 and is dehydrated in centrifuge 6 and recovered as a product via line 24. Alternatively, the gypsum may be filtered instead of centrifuged and then recovered via line 24. The supernatant liquid from thickener 5 is a clear liquid containing $MgSO_4$.

The supernatant liquid is returned to double decomposition tank 1 via line 17/19 with any remaining liquid which is removed via line 18 from centrifuge 6 and recovered as $Mg(OH)_2$. The magnesium compound is recirculated completely in the system so in principle there is no need to add magnesium compound after process start up. This is one of the greatest merits of this invention while $MgSO_4$ and $Ca(OH)_2$ are used in the above description, there may be used as useful magnesium and calcium compounds such as $Mg(OH)_2$, $MgSO_3$, $Mg(HSO_3)_2$ and $MgCO_3:CaCO_3$.

Figure 2:
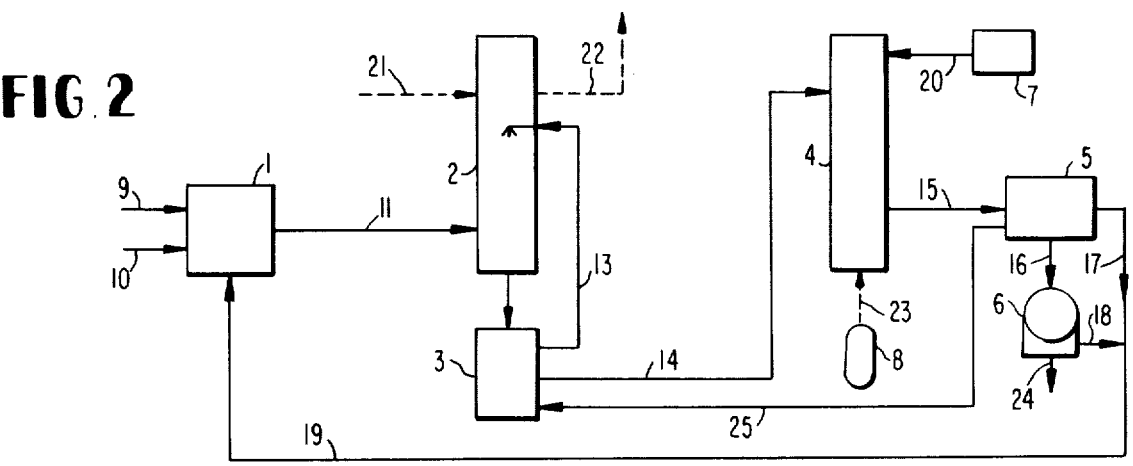

FIG. 2 is a flow sheet representing another embodiment of this invention, where like units to those of FIG. 1 are identified using like terminology. This embodiment differs from that of FIG. 1 in that line 25 is shown, whereby the supernatant liquid of thickener 5 returned to circulation and absorbing slurry tank 3. This provides the merit of lowering the density of the slurry around absorber 2 and oxidizer 4. As earlier indicated, FIG. 3 shows the relationship between the molar ratio of Mg/Ca and absorbing efficiency for $SO_2$.

The ratios of components in the processing lines 11, 14, 15 and 17-19 are shown in the following table:

| Component | Ratios of Components (g mol/l) | | | |
| --- | --- | --- | --- | --- |
| | Line 11 (55° C) | 14 | 15 | 17-19 |
| $Ca(OH)_2$ or $CaCO_3$ | 1.6 | Nil | — | — |
| $CaSO_4$ | 0.43 | 0.07 | 0.279 | — |
| $CaSO_3$ | — | 0.19 | — | — |
| $Mg(OH)_2$ | 0.4 | — | — | — |
| $MgSO_4$ | — | 0.397 | 0.42 | 0.42 |
| $MgSO_3$ | — | 0.019 | — | — |
| $Mg(HSO_3)_2$ | — | Nil | — | — |
| $H_2O$ | Balance | Balance | Balance | Balance |

Having thus generally described the invention, the following non-limiting example is given to illustrate the same.

EXAMPLE

| Treatment gas: | Stack gas of heavy oil combustion burner |
| --- | --- |
| Amount of treatment gas: | 5,000 $Nm^3/H$ |
| Concentration of $SO_2$: | 1500 ppm |
| Gas temperature: | 200° C. |

DESULFURATION PROCESS UNIT

| pH of slurry: | 4.5 - 2.0 |
| --- | --- |
| Slurry Temp.: | 60 - 70 (° C) |
| Utility factor of Oxygen | 30 - 40 (%) |
| Avarage oxidation time: | 5 - 10 (hr) |

GYPSUM RECOVERY

| Amount of recovery: | 60 Kg/H |
| --- | --- |
| Type of crystal | piller shape |
| Particle size of crystal: | 50 - 100μ (long axis) |

DISOLVE-REACTION PROCESS UNIT

| Reaction temperature: | ordinary temperature |
| --- | --- |
| Reaction time: | 10 - 15 (min.) |
| Reaction pressure: | atmospheric pressure |

While the invention has been particularly shown and described with reference to preferred embodiments thereof, it will be understood by those skilled in the art that various changes in form and details may be made therein without departing from the spirit and scope of the invention.

What is claimed is:

1. A method for removing sulfur oxides from stack gas as gypsum comprising the steps of:
    adding $Mg(OH)_2$ to an absorbent comprising predominantly at least one calcium compound;
    absorbing the sulfur oxides in the absorbent whereby the sulfur oxides are converted to the sulfite form in a slurry;
    oxidizing the resulting sulfite to form a slurry composed essentially of gypsum and supernatant liquid containing as the main component $MgSO_4$;
    maintaining the pH of the slurry produced in the oxidizing step under 5 to produce a good quality gypsum;
    separating the gypsum from the supernatant liquid to recover the gypsum as a product; and
    double decomposing the supernatant liquid in the presence of $Ca(OH)_2$ to produce $CaSO_4$ and regenerate the $Mg(OH)_2$ which is added to the absorbent to recirculate almost all the magnesium in the system, the molar ratio of Ca.Mg supplied to the absorbent being 0.5 to 99.0.

2. A method for removing sulfur oxides from stack gas as recited in claim 1, wherein said calcium compound is $Ca(OH)_2$.

3. A method for removing sulfur oxides from stack gas as recited in claim 1, wherein the step of maintaining the pH of the slurry produced in the oxidizing step under 5 is performed by adding $H_2SO_4$ to the slurry.

4. A method for removing sulfur oxides from stack gas as recited in claim 1, wherein some of the supernatant liquid separated from the gypsum is recirculated to the absorbent.